United States Patent
Matsushita et al.

(10) Patent No.: US 12,474,295 B2
(45) Date of Patent: Nov. 18, 2025

(54) ANALYSIS DEVICE AND ANALYSIS METHOD

(71) Applicant: Hitachi High-Tech Corporation, Tokyo (JP)

(72) Inventors: Yufuku Matsushita, Tokyo (JP); Atsushi Kishioka, Tokyo (JP); Haruyoshi Yamamoto, Tokyo (JP); Masafumi Miyake, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 833 days.

(21) Appl. No.: 17/627,910

(22) PCT Filed: Apr. 8, 2020

(86) PCT No.: PCT/JP2020/015773
§ 371 (c)(1),
(2) Date: Jan. 18, 2022

(87) PCT Pub. No.: WO2021/014695
PCT Pub. Date: Jan. 28, 2021

(65) Prior Publication Data
US 2022/0404310 A1    Dec. 22, 2022

(30) Foreign Application Priority Data

Jul. 19, 2019   (JP) .................................. 2019-133863

(51) Int. Cl.
*G01N 27/416*   (2006.01)
*G01N 27/333*   (2006.01)

(52) U.S. Cl.
CPC ....... *G01N 27/4163* (2013.01); *G01N 27/333* (2013.01)

(58) Field of Classification Search
CPC .......................... G01N 27/4163; G01N 27/333
See application file for complete search history.

(56) References Cited

U.S. PATENT DOCUMENTS 3,787,291 A * 1/1974 Deuringer ............. G01N 35/00
                                                                  435/14
5,284,568 A * 2/1994 Pace ..................... G01N 27/403
                                                                204/403.03
(Continued)

FOREIGN PATENT DOCUMENTS

EP          0074198 A1 *  8/1982  ............. B01D 13/04
JP     2012-202948 A      10/2012
(Continued)

OTHER PUBLICATIONS

R. A. Cottis, "Interpretation of Electrochemical Noise Data," Corrosion—vol. 57, No. 3, 2001, pp. 265-285 (Year: 2001).*
(Continued)

*Primary Examiner* — Alexander S Noguerola
(74) *Attorney, Agent, or Firm* — Volpe Koenig

(57) ABSTRACT

An analysis device measures ion concentration in a sample to detect an abnormality using an ion selective electrode. The analysis device includes an ion selective electrode that obtains a potential based on the ion concentration, a reference electrode that obtains a potential based on a reference liquid, a measurement unit that measures an electromotive force between the ion selective electrode and the reference electrode, an analyzer that analyzes a potential change of the electromotive force in a certain time region, and a storage that stores abnormality analysis data indicating a relation between the potential change and an abnormality of the analysis device. The analyzer acquires a parameter for the potential change of the electromotive force measured by the measurement unit, and analyzes the abnormality of the analysis device based on the parameter and the abnormality analysis data stored in the storage.

13 Claims, 10 Drawing Sheets

(56) References Cited

U.S. PATENT DOCUMENTS

| | | | |
|---|---|---|---|
| 2005/0112756 A1* | 5/2005 | Nakatani | G01N 33/48728 205/777.5 |
| 2006/0096860 A1* | 5/2006 | Stein | G01N 27/333 204/400 |
| 2010/0219074 A1* | 9/2010 | Ishibe | G01N 27/4163 204/406 |
| 2012/0261260 A1 | 10/2012 | Li et al. | |
| 2014/0151224 A1* | 6/2014 | Glezer | B01L 9/527 204/407 |
| 2019/0265187 A1* | 8/2019 | Kishioka | G01N 1/00 |
| 2021/0318266 A1 | 10/2021 | Kishioka et al. | |

FOREIGN PATENT DOCUMENTS

| | | | | |
|---|---|---|---|---|
| JP | 2014-035255 A | 2/2014 | | |
| WO | WO 2018020880 A1 * | 2/2018 | | G01N 35/00 |
| WO | 2020/054473 A1 | 3/2020 | | |

OTHER PUBLICATIONS

Nottage e al., "State-of-the-Art Analysis of High-Frequency (Gamma Range) Electroencephalography in Humans," Neuropsychobiology 2015;72:219-228 (Year: 2015).*

Khemiri et al., "Preprocessing of Biomedical Signals: Removing of the Baseline Artifacts," 2013 10th International Multi-Conference on Systems, Signals & Devices (SSD) Hammamet, Tunisia, Mar. 18-21, 2013 (Year: 2013).*

Kanoga et al., "Review of Artifact Rejection Methods for Electroencephalographic Systems," Published: Nov. 29, 2017, Open Access Peer-Reviewed Chapter From the Edited Volume—Electroencephalography Edited by Phakkharawat Sittiprapaporn (Year: 2017).*

Carlo Maccà "Review—Response time of ion-selective electrodes Current usage versus IUPAC recommendations," Analytica Chimica Acta 512 (2004) 183-190, pp. 183-190 (Year: 2004).*

Burnett et al, "Sodium measurements in the presence of paraproteins by four direct ISE methods and flame photometry compared," Ann Clin Biochem 1988; 25: 102-109 (Year: 1988).*

'Surface dipole layer' in IUPAC Compendium of Chemical Terminology, 3rd ed. International Union of Pure and Applied Chemistry; 2006. Online version 3.0.1, 2019. https://doi.org/10.1351/goldbook. S06169 (Year: 2014).*

Chinese Office Action issued on Jan. 17, 2024 for Chinese Patent Application No. 202080049766.2.

Homborg, A.M., "An integrated approach in the time, frequency and time-frequency domain for the identification of corrosion using electrochemical noise," Journal, Netherlands Defence Academy, Netherlands (2016).

Darowicki, K., "Joint time-frequency analysis of electrochemical noise," Journal, Technical University of Gdansk, Poland (2001).

Extended European Search Report issued on Jul. 4, 2023 for European Patent Application No. 20842677.5.

* cited by examiner

ANALYSIS DEVICE AND ANALYSIS METHOD

TECHNICAL FIELD

The present disclosure relates to an analysis device and an analysis method.

BACKGROUND ART

In order to quickly and easily measure concentrations of ions (electrolytes) of potassium, sodium, chloride, and the like in a biological sample including blood, a plurality of ion selective electrodes (ISE) corresponding to the ions to be detected are mounted on an analysis device.

An electrolyte analysis unit including the ion selective electrodes is mounted on, for example, an automatic analysis device. The automatic analysis device is suitably used singly or as an element of a biochemical automatic analysis device or the like in order to perform clinical examinations automatically, quickly, and continuously.

The ion selective electrode is used in combination with a reference electrode. The activity (concentration) of a target ion is obtained by measuring a potential difference generated between the ion selective electrode and the reference electrode. In the field of clinical examination, it is highly necessary to quantify the concentration of an electrolyte contained in a specimen that is a biological sample such as blood, particularly serum and plasma, and urine. In some cases, the specimen is directly measured using the ion selective electrode, that is, measured using a so-called non-dilution method. In some cases, a so-called dilution method is performed. In the dilution method, dilution is performed by adding and mixing a certain amount of diluent to a certain amount of a specimen, and then measurement is performed using the ion selective electrode.

The dilution method has features that the required amount of a specimen is small, the concentration of coexisting substances of proteins and lipids in a measurement liquid is low, the influence of contamination by the coexisting substances is small, and the stability of the ion selective electrode is high. Thus, in an analysis of electrolyte concentration using an automatic analysis device, a combination of a flow cell type ion selective electrode and a dilution method is currently the mainstream. A container referred to as a dilution tank is used to dilute the specimen. The diluted specimen (measurement liquid) prepared in the dilution tank is fed to the flow cell type ion selective electrode through a pipe, and then is measured. An internal standard solution is dispensed into the dilution tank alternately with the specimen, and measured alternately with the specimen.

The electrolyte concentration in a living body is usually maintained in a narrow concentration range, and is significant clinically or therapeutically even with a slight change in concentration. Thus, the ion selective electrode is required to have extremely high measurement accuracy, and various techniques have been developed to reduce measurement errors as much as possible.

For example, PTL 1 discloses a method of specifying a defective component by referring to a potential at a drive timing of the component, as a method of specifying a cause of an error in a measured value of an ion selective electrode.

CITATION LIST

Patent Literature

PTL 1: JP 2009-121817 A

SUMMARY OF INVENTION

Technical Problem

As the cause of the error (abnormality) in the measured value, there are air bubbles mixed into a flow path between the ion selective electrode and the reference electrode, vibration of a liquid in the flow path, mixing of electrical noise into a measurement system, and the like. A normal potential is not output due to such error causes. It is considered that the error causes are derived from a defect of a component of the analysis device or an installation environment of the analysis device. There is a concern that the measurement error may recur unless the error causes are removed. Therefore, in order to obtain a highly accurate analysis result, it is necessary to specify and remedy the error causes.

However, in the conventional analysis device represented by PTL 1, it is difficult to specify the error cause derived from the installation environment of the analysis device and the error cause derived from the defect of the component that cannot acquire a drive timing signal of the component.

Thus, the present disclosure provides a technique for analyzing an abnormality in an analysis device using an ion selective electrode.

Solution to Problem

According to the present disclosure, an analysis device measures ion concentration in a sample. The analysis device includes an ion selective electrode that obtains a potential based on the ion concentration, a reference electrode that obtains a potential based on a reference liquid, a measurement unit that measures an electromotive force between the ion selective electrode and the reference electrode, an analyzer that analyzes a potential change of the electromotive force in a certain time region, and a storage that stores abnormality analysis data indicating a relation between the potential change and an abnormality of the analysis device. The analyzer acquires a parameter for the potential change of the electromotive force measured by the measurement unit, and analyzes the abnormality of the analysis device based on the parameter and the abnormality analysis data stored in the storage.

Further features relating to the present disclosure will become apparent from the description of the specification and the accompanying drawings. In addition, the aspects of the present disclosure are achieved and realized by elements, the combination of various elements, the detailed description below, and the aspects of the appended claims.

The description in the specification is merely a typical example and is not intended to limit the scope of the claims or the application example of the present disclosure in any sense.

Advantageous Effects of Invention

According to the present disclosure, the analysis device can analyze the abnormality in the analysis device using the ion selective electrode.

Objects, configurations, and advantageous effects other than those described above will be clarified by the descriptions of the following embodiments.

DESCRIPTION OF EMBODIMENTS

First Embodiment

<Example of Configuration of Analysis Device>

Figure 1:
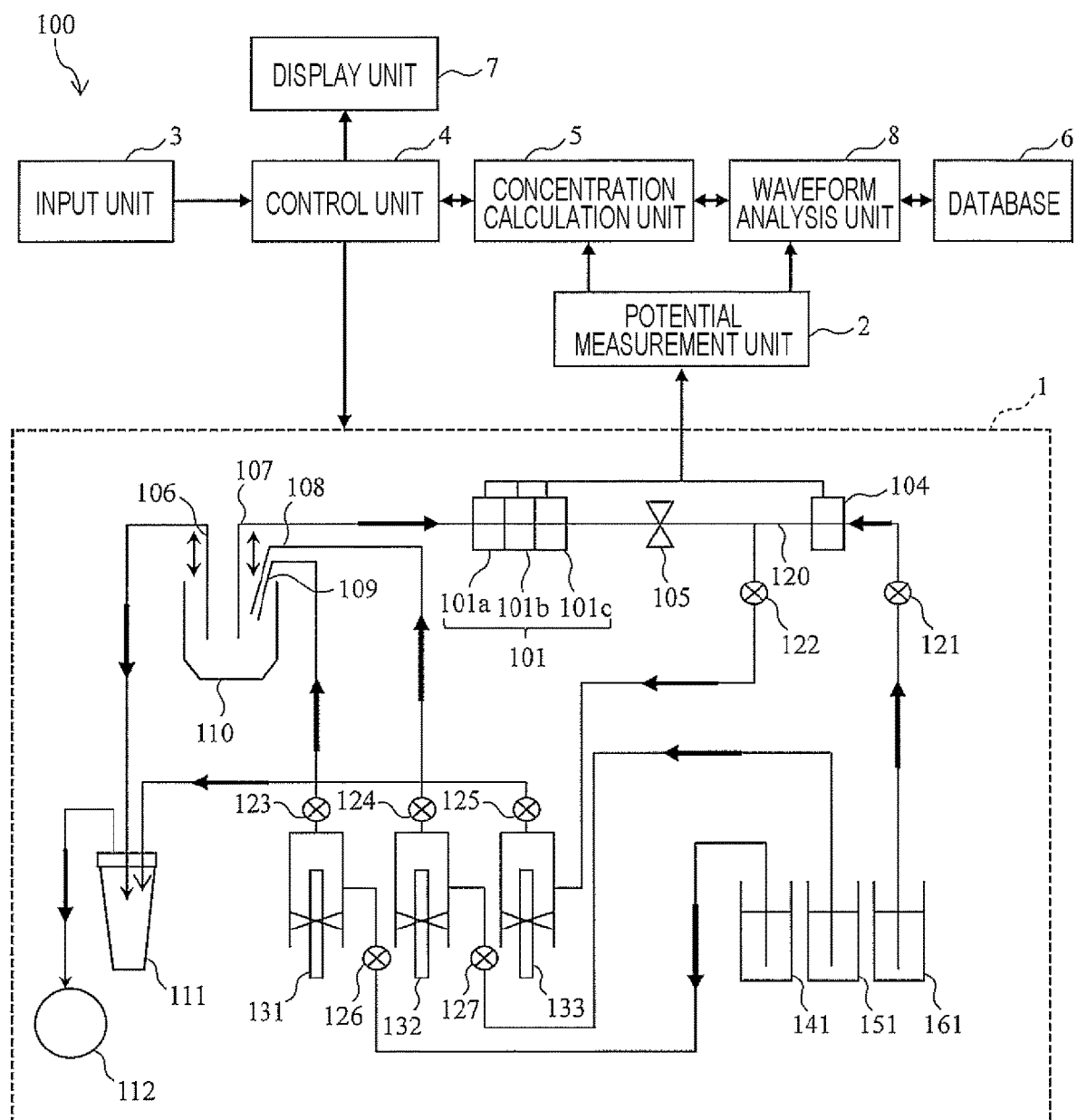
FIG. 1 is a schematic diagram illustrating an analysis device according to a first embodiment.

FIG. 1 is a schematic diagram illustrating an analysis device 100 according to a first embodiment. As illustrated in FIG. 1, the analysis device 100 includes an electrolyte analysis unit 1, a potential measurement unit 2 (measurement unit), an input unit 3, a control unit 4, a concentration calculation unit 5, a database 6, a display unit 7, and a waveform analysis unit 8 (analyzer).

The electrolyte analysis unit 1 includes three types of ion selective electrodes 101 (chlorine ion electrode 101a, potassium ion electrode 101b, and sodium ion electrode 101c), a comparative electrode 104 (reference electrode), a pinch valve 105, a vacuum suction nozzle 106, a sipper nozzle 107, a diluent supply nozzle 108, an internal-standard-solution supply nozzle 109, a dilution tank 110, a waste liquid tank 111, a vacuum pump 112, electromagnetic valves 121 to 127, an internal-standard-solution syringe pump 131, a diluent syringe pump 132, a sipper syringe pump 133, an internal standard solution bottle 141, a diluent bottle 151, and a comparative electrode liquid bottle 161.

As the ion selective electrode 101, for example, a flow cell type ion selective electrode can be used. The number of ion selective electrodes 101 can be changed in accordance with the number of ion species to be measured. The ion selective electrode 101 can be adapted to all ion species. The ion selective electrode 101 generates a potential corresponding to the ion concentration in a sample.

A comparative electrode liquid (reference liquid) is stored in the comparative electrode liquid bottle 161. The comparative electrode liquid is put into a flow path of the comparative electrode 104 by the sipper syringe pump 133. As the comparative electrode liquid, for example, a potassium chloride aqueous solution or the like can be used. The comparative electrode 104 generates a potential corresponding to the ion concentration in the comparative electrode liquid.

An internal standard solution (IS) is stored in the internal standard solution bottle 141. The internal standard solution is dispensed into the dilution tank 110 by the internal-standard-solution syringe pump 131 and the internal-standard-solution supply nozzle 109.

A specimen is dispensed into the dilution tank 110 by a sampling mechanism (not illustrated). A diluent is stored in the diluent bottle 151. The diluent is dispensed into the dilution tank 110 by the diluent syringe pump 132 and the diluent supply nozzle 108 and is mixed with the specimen.

In this manner, the internal standard solution or a measurement solution (referred to as a "sample (S)" below) obtained by mixing the specimen and the diluent is put into the dilution tank 110.

Here, an operation when a liquid filled in the dilution tank 110 is filled in a measurement flow path will be described. First, when the liquid filled in the dilution tank 110 is put into the flow path of the ion selective electrode 101, the electromagnetic valve 121 and the electromagnetic valve 125 are closed, and the pinch valve 105 and the electromagnetic valve 122 are opened. In addition, the sipper nozzle 107 is lowered into the dilution tank 110, and the sipper syringe pump 133 is pulled.

Then, when the comparative electrode liquid is put into the flow path of the comparative electrode 104, the electromagnetic valve 121 is opened, the pinch valve 105 is closed, and the sipper syringe pump 133 is pulled, so that the comparative electrode liquid is put from the comparative electrode liquid bottle 161 into the flow path of the comparative electrode 104. In order to discharge the liquid accumulated in the sipper syringe pump 133, the electromagnetic valve 122 is closed, the electromagnetic valve 125 is opened, and the sipper syringe pump 133 is pushed.

The comparative electrode liquid put into the flow path of the comparative electrode 104 and the sample put into the ion selective electrode 101 come into contact with each other at a liquid entanglement portion 120. Thus, the ion selective electrode 101 and the comparative electrode 104 are electrically connected to each other through the liquid.

After the sample is put into the flow path of the ion selective electrode 101 and the comparative electrode liquid is put into the flow path of the comparative electrode 104, the vacuum suction nozzle 106 is lowered and the vacuum pump 112 is driven. Thus, the liquid (sample or internal standard solution) remaining in the dilution tank 110 is sucked and discarded in the waste liquid tank 111. The comparative electrode liquid put into the comparative electrode 104 is discarded in the waste liquid tank 111 by operating the electromagnetic valve 121, the vacuum pump 112, and the sipper syringe pump 133.

A potential difference (electromotive force) between the comparative electrode 104 and each ion selective electrode 101 changes depending on the ion concentration of an analysis target in the sample put into the flow path of the ion selective electrode 101. The potential measurement unit 2 measures the electromotive force, and outputs a measurement result (such as temporal transition of the electromotive force) to the concentration calculation unit 5 and the waveform analysis unit 8. Hereinafter, the "electromotive force" may be simply referred to as a "potential." Here, in a period of measuring the potential, a certain time width including time for calculating the ion concentration may be referred to as a "certain time region." An acquisition start time $t_i$ and an acquisition end time $t_e$ in the certain time region can be freely set.

A time interval (sampling rate) of potential measurement by the potential measurement unit 2 can be, for example, 0.006 seconds or shorter. As the sampling rate is higher, an analyzable frequency band is higher, and various noise sources can be analyzed. However, there is a trade-off relation that the data size increases as the sampling rate is improved. Therefore, by setting the time interval of the potential measurement to 0.006 seconds or shorter as described above, it is possible to analyze frequency noise (50 to 60 Hz) derived from an AC power supply that is a noise source for a general circuit, vibration noise (about 30 Hz or less) with large amplitude, and the like. In addition, it is also possible to suppress an increase in data size. The analyzable frequency F (Hz) and the sampling rate $S_{rate}$ (s) can be obtained by F=(1/S)/2.56. Thus, when the sampling rate is 0.006 seconds, a frequency of 65 Hz can be analyzed.

The concentration calculation unit 5 calculates the ion concentration based on the measurement result of the potential by the potential measurement unit 2. As a method of measuring the ion concentration, a known method can be adopted. As described later, the concentration calculation unit 5 calculates the standard deviation σ, the difference ΔV between the maximum value and the minimum value, and the average value $V_{avg}$ of the potential in a certain time region.

Although details will be described later, the waveform analysis unit 8 performs regression analysis and frequency analysis (these may be referred to as "waveform analysis") on the waveform of the potential change of the potential measured by the potential measurement unit 2, and analyzes the cause of an abnormality of the analysis device 100.

The input unit 3 is an input device such as a mouse, a keyboard, or a touch panel, for example, and is used for a user to input various types of data and instructions to the analysis device 100.

The control unit 4 controls the entirety of the analysis device 100. Specifically, the control unit 4 performs drive control of each component of the electrolyte analysis unit 1, control of processing in the concentration calculation unit 5 and the waveform analysis unit 8, control of display on the display unit 7, and the like. The control unit 4 receives an input from the input unit 3. The processing in the control unit 4, the concentration calculation unit 5, and the waveform analysis unit 8 may be performed by one processor mounted on the analysis device 100.

The display unit 7 displays results of the processing in the concentration calculation unit 5 and the waveform analysis unit 8, a GUI screen, and the like.

The database 6 (storage) stores data necessary for processing by the concentration calculation unit 5 and the waveform analysis unit 8, results of processing by the concentration calculation unit 5 and the waveform analysis unit 8, and the like. The database 6 stores data indicating a relation between the potential change measured by the potential measurement unit 2 and the cause of the abnormality of the analysis device 100, as the data necessary for the processing by the waveform analysis unit 8.

FIG. 1 illustrates a form in which the database 6 is mounted in the analysis device 100. The present disclosure is not limited thereto. The database 6 can be used in any form such as a form in which the database 6 is connected on the Internet, a form in which the database 6 is detachable from the analysis device 100, a form in which a storage medium is connected to the analysis device 100, or a form in which the respective forms are combined. The database 6, the concentration calculation unit 5, and the waveform analysis unit 8 are configured to be able to transmit and receive data, and can be connected, for example, to the Internet to acquire measurement data online.

All of the potential measurement unit 2, the input unit 3, the control unit 4, the concentration calculation unit 5, the display unit 7, and the waveform analysis unit 8 are not necessarily mounted in the analysis device 100. Some of the units may be provided in the other device, and the other device and the analysis device 100 may communicate with each other to transmit and receive data.

<Analysis Method>

Figure 2:
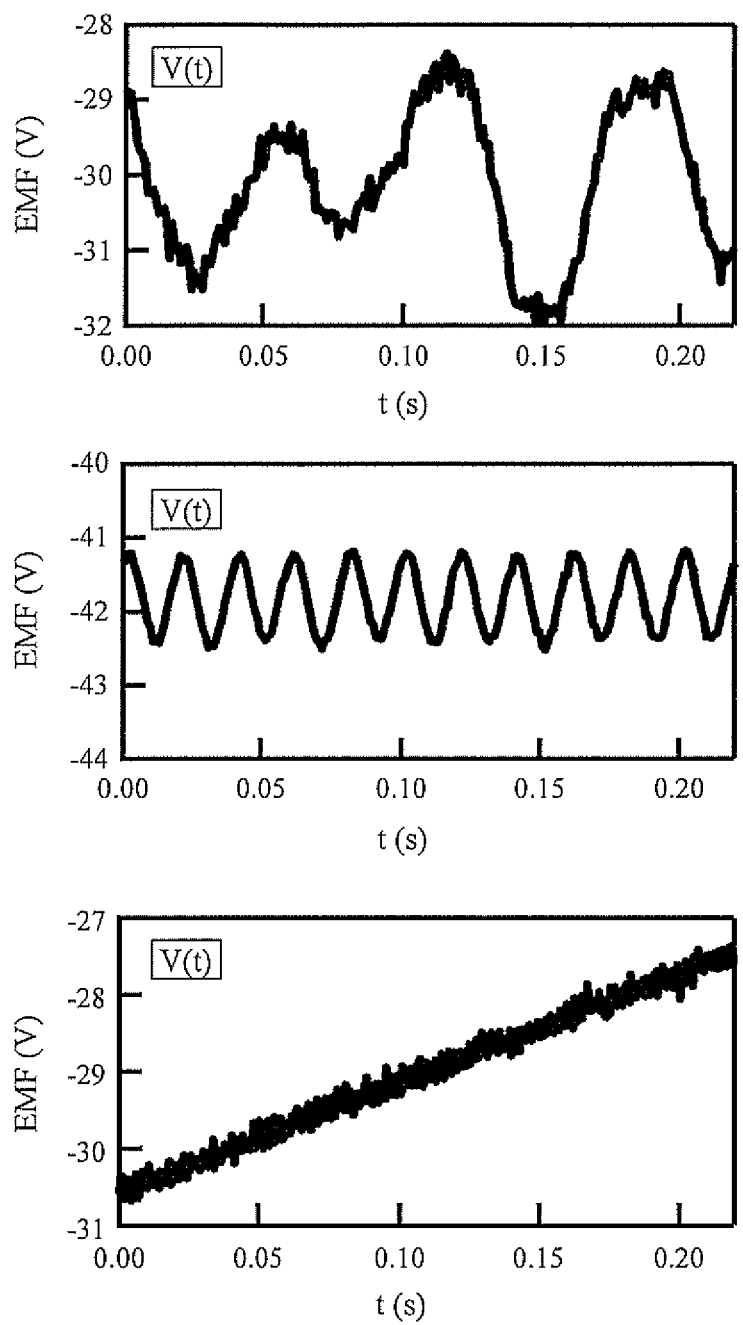
FIG. 2 illustrates graphs of potential changes when measurement errors occur.

FIG. 2 illustrates graphs of potential changes V(t) in cases where measurement errors occur. Each graph of FIG. 2 shows a potential change V(t) which is a temporal change of the potential output from the potential measurement unit 2. The horizontal axis indicates the time t (second). The vertical axis indicates the electromotive force EMF (V). As illustrated in FIG. 2, the potential change V(t) shows a potential waveform corresponding to the cause (error cause) of a measurement error, and a clear difference in gradient and frequency can be recognized. Examples of the error cause include air bubbles mixed in the flow path, a vibration of the electrolyte analysis unit 1, and electrical noise. As a result of studying the error cause and the potential waveform, the inventors have found that it is possible to specify the error cause by acquiring and analyzing a parameter associated with the potential change V(t). Although not illustrated in FIG. 2, the potential waveform when no abnormality occurs (when the cause of the measurement error is not mixed) has a linear shape maintained at a certain constant electromotive force.

(Analysis Method According to Reference Example and Problem Thereof)

Here, first, an analysis method according to a reference example using the analysis device 100 will be described. The analysis method is actually performed by the control unit 4 controlling the electrolyte analysis unit 1, the potential measurement unit 2, the concentration calculation unit 5, and the display unit 7. The following description will be made on the assumption that each of the above components is set as the subject of the operation.

Figure 3:
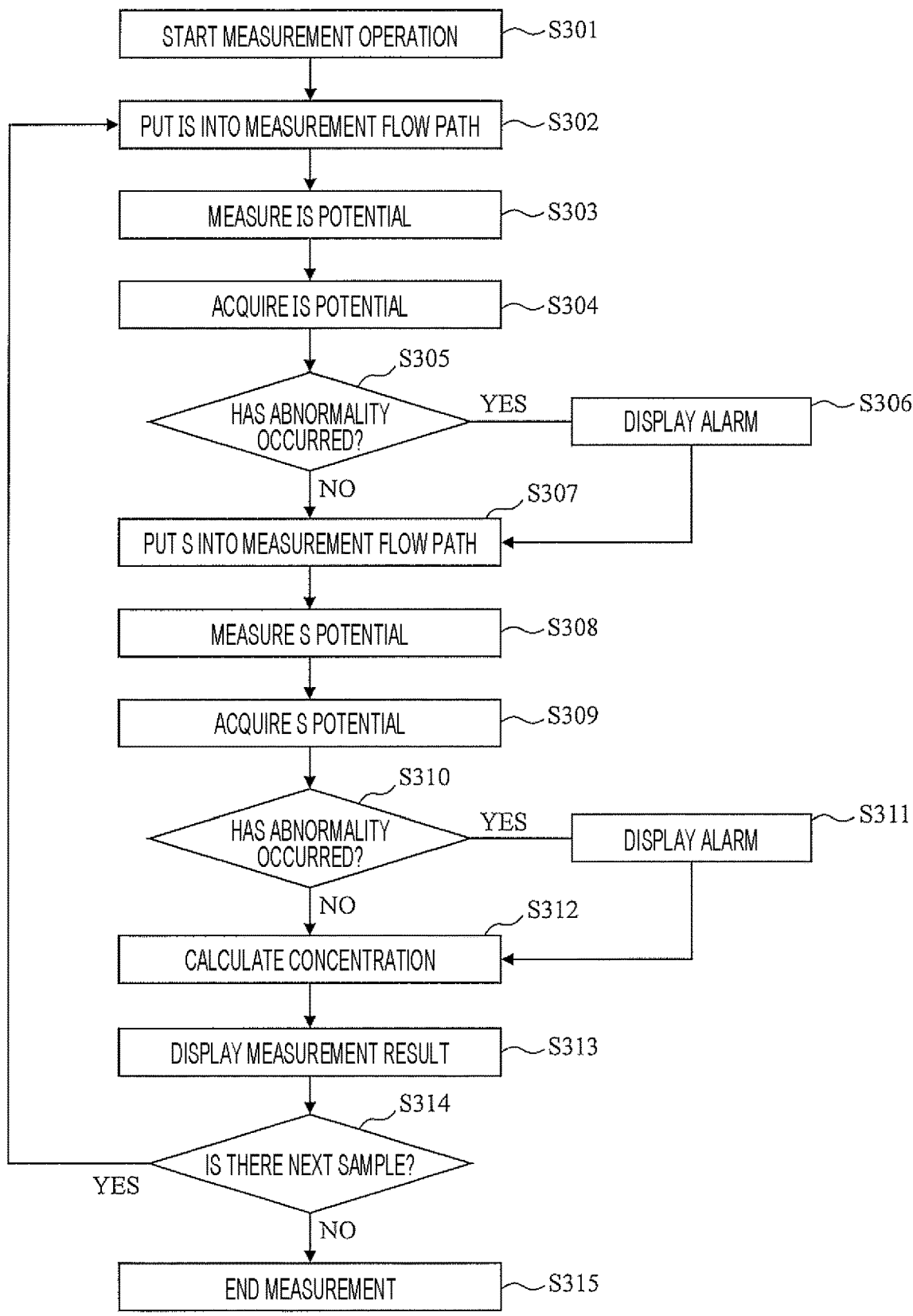
FIG. 3 is a flowchart illustrating an analysis method according to a reference example.

FIG. 3 is a flowchart illustrating the analysis method according to the reference example. First, in Step S301, when a user inputs an instruction to start an operation from the input unit 3, the control unit 4 drives the electrolyte analysis unit 1 to start a measurement operation.

In Step S302, the electrolyte analysis unit 1 drives the internal-standard-solution syringe pump 131 and the electromagnetic valves 123 and 126 to put the internal standard solution (IS) into the dilution tank 110 from the internal-standard-solution supply nozzle 109 and put the internal standard solution into the measurement flow path.

In Step S303, the potential measurement unit 2 measures a potential difference (electromotive force) between the comparative electrode 104 and each ion selective electrode 101, and outputs the potential difference as an internal standard solution potential to the concentration calculation unit 5. In Step S304, the concentration calculation unit 5 acquires the internal standard solution potential (IS potential).

In Step S305, the concentration calculation unit 5 calculates the standard deviation σ(IS), the difference ΔV(IS) between the maximum value and the minimum value, and the average value $V_{avg}$(IS) of the internal standard solution potential. Then, the concentration calculation unit 5 refers to the database 6 to compare the standard deviation σ(IS), the difference ΔV(IS), and the average value $V_{avg}$ (IS) with threshold values (abnormality threshold values) stored in the database 6, respectively. Thus, the concentration calculation unit 5 determines whether or not there is an abnormality in the measured internal standard solution potential. The database 6 stores, for example, the maximum value or a range of values with which it can be determined that no abnormality has occurred, as the abnormality threshold value of each of σ(IS), ΔV(IS), and $V_{avg}$(IS). The concentration calculation unit 5 stores each parameter (standard deviation σ(IS), difference AV(IS) between maximum value and minimum value, and average value $V_{avg}$(IS)) calculated from the internal standard solution potential in the database 6 both when it is determined that there is an abnormality and when it is determined that there is no abnormality.

When it is determined in Step S305 that there is an abnormality (YES), the display unit 7 displays an alarm for notifying the user of the abnormality in Step S306. Although not illustrated, the electrolyte analysis unit 1 discharges the remaining internal standard solution from the dilution tank 110 before performing the next Step S307.

In Step S307, the electrolyte analysis unit 1 puts a specimen into the dilution tank 110 by a sampling mechanism (not illustrated in FIG. 1). The electrolyte analysis unit 1 drives the diluent syringe pump 132 to put a diluent from the diluent supply nozzle 108. In this manner, a sample as a mixed solution is obtained. Then, the electromagnetic valve 121 and the electromagnetic valve 125 are closed, and the pinch valve 105 and the electromagnetic valve 122 are opened. In addition, the sipper nozzle 107 is lowered into the dilution tank 110, and the sipper syringe pump 133 is driven to put the sample (S) into the measurement flow path.

In Step S308, the potential measurement unit 2 measures the potential difference (electromotive force) between the comparative electrode 104 and each ion selective electrode 101, and outputs the potential difference as a sample potential to the concentration calculation unit 5. In Step S309, the concentration calculation unit 5 acquires the sample potential (S potential). Although not illustrated, for example, after the acquisition in Step S309, the electrolyte analysis unit 1 discharges the remaining sample in the dilution tank 110.

In Step S310, the concentration calculation unit 5 calculates the standard deviation σ(S), the difference ΔV(S) between the maximum value and the minimum value, and the average value $V_{avg}$(S) of the sample potential. Then, the concentration calculation unit 5 compares the standard deviation σ(S), the difference ΔV(S), and the average value $V_{avg}$(S) with abnormality threshold values stored in the database 6, respectively. Thus, the concentration calculation unit 5 determines whether or not there is an abnormality in the measured sample potential. The concentration calculation unit 5 stores each parameter (standard deviation σ(S), difference ΔV(S) between maximum value and minimum value, and average value $V_{avg}$(S)) calculated from the sample potential in the database 6 both when it is determined that there is an abnormality and when it is determined that there is no abnormality.

When it is determined in Step S310 that there is an abnormality (YES), the display unit 7 displays an alarm for notifying the user of the abnormality in Step S311.

In Step S312, the concentration calculation unit 5 calculates the ion concentration in the sample based on the average value $V_{avg}$(IS) of the internal standard solution potential and the average value $V_{avg}$(S) of the sample potential. The concentration calculation unit 5 stores the calculated ion concentration in the database 6.

In Step S313, the display unit 7 displays the calculated ion concentration (measurement result).

In Step S314, the control unit 4 determines whether or not there is a next sample. For example, the control unit 4 can determine whether or not there is a next sample, in a manner that, before Step S301, the number of samples to be measured is input to the analysis device 100 in advance, and the control unit 4 compares the number of samples to be measured with the number of measured samples.

When there is the next sample (YES), the process returns to Step S302, and the ion concentration is measured in the similar manner. When there is no next sample (NO), the process proceeds to Step S315 to end the measurement.

As described above, in the reference example, when an abnormality has occurred, the user needs to check the alarm display on the display unit 7 and determine whether or not re-measurement can be performed. When alarms are issued frequently, it is necessary to stop the measurement operation and perform maintenance of the analysis device 100. In this case, the error cause may be unknown only by the above-described alarm display based on the standard deviation σ, the difference ΔV between the maximum value and the minimum value, and the average value $V_{avg}$. Therefore, it takes time to perform work for specifying the error cause and recovery work.

(Details of Analysis Method According to First Embodiment)

Therefore, in the analysis method in the present embodiment, the error cause is specified in a manner that the potential measurement unit 2 measures the potential, and then the waveform analysis unit 8 analyzes the potential waveform and acquires the parameter associated with the potential waveform, in addition to the measurement operation in the reference example.

Figure 4:
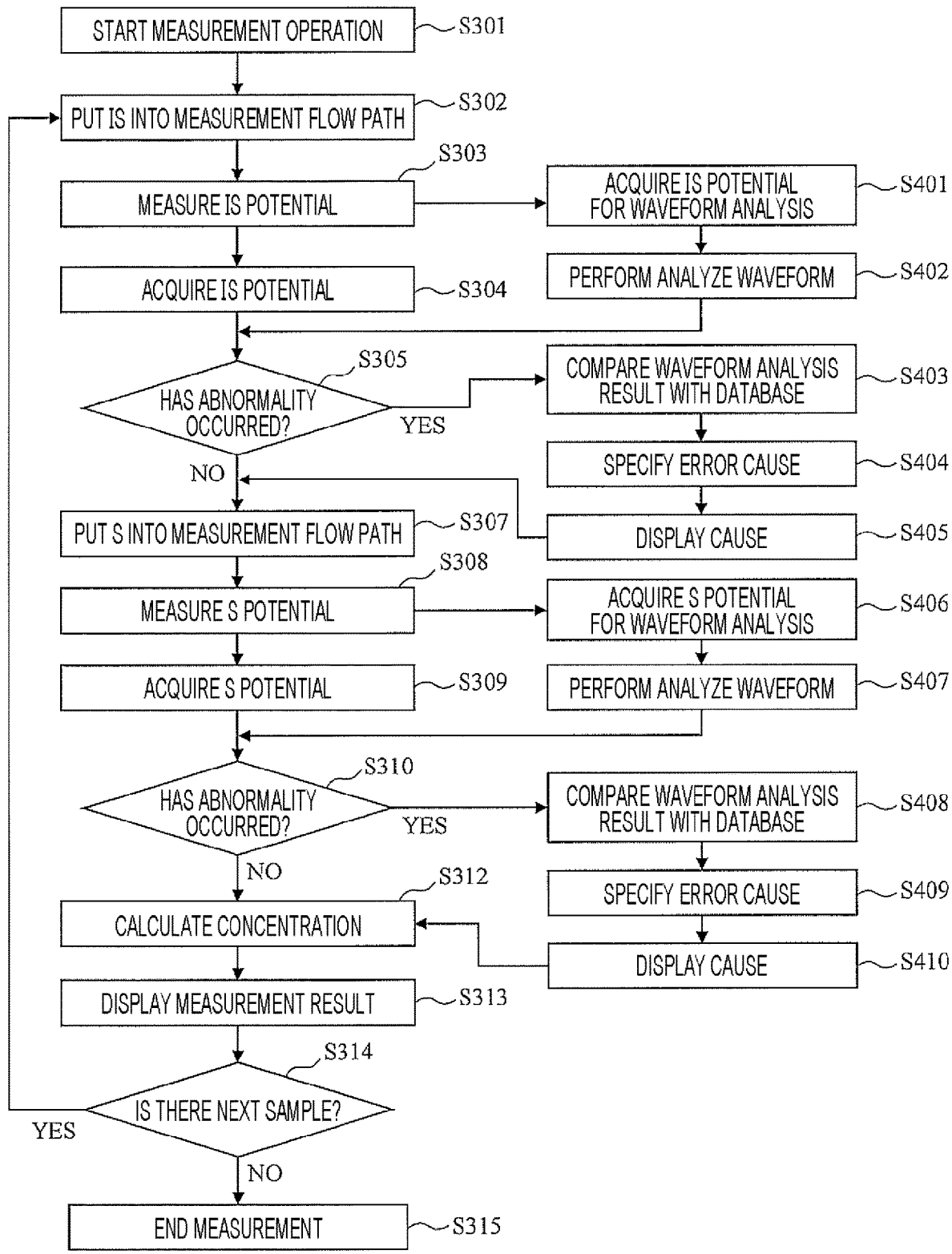
FIG. 4 is a flowchart illustrating an analysis method according to the first embodiment.

FIG. 4 is a flowchart illustrating the analysis method according to the first embodiment. In FIG. 4, steps similar to those illustrated in FIG. 3 are denoted by the same reference signs. Only differences from the flowchart in FIG. 3 will be described below.

In the analysis method in the present embodiment, after Step S303, Steps S401 and S402 are performed by the waveform analysis unit 8 in parallel with the acquisition (Step S304) of the internal standard solution potential (IS potential) by the potential measurement unit 2.

In Step S401, the waveform analysis unit 8 acquires the internal standard solution potential for waveform analysis from the potential measurement unit 2. The internal standard solution potential for waveform analysis is a potential in a certain time region. An acquisition start time $t_i$ and an acquisition end time to of the internal standard solution potential for waveform analysis can be freely set.

In Step S402, the waveform analysis unit 8 acquires a parameter (gradient or the like) of the potential change V(t) of the internal standard solution potential and a parameter for the frequency by waveform analysis, and stores the parameters in the database 6. Details of a method of acquiring the above parameters will be described later.

Then, when it is determined in Step S305 that there is an abnormality in the internal standard solution potential, from the standard deviation σ(IS), the difference ΔV(IS) between the maximum value and the minimum value, and the average value $V_{avg}$(IS) calculated by the concentration calculation unit 5 (YES), Steps S403 to S405 are performed instead of Step S306.

Here, the database 6 stores, in advance, abnormality specification data (abnormality analysis data). The abnormality specification data indicate information such as abnormality threshold values of the parameters for the gradient and the frequency of the potential change V(t), an error cause when a certain parameter exceeds the abnormality threshold value, a description of a method for handling the error cause, a component that causes the error cause, and a cause outside the device. The abnormality specification data stored in the database 6 may be based on information on a waveform of the potential change V(t) at the time of device shipment or a continuous operation, or may be freely set. In Step S403, the waveform analysis unit 8 refers to the database 6 to compare each parameter calculated in Step S402 with the abnormality threshold value.

In Step S404, the waveform analysis unit 8 specifies an error cause and a method of handling the error cause, based on the comparison result between each parameter and the abnormality threshold value and the abnormality specification data in the database 6. Details of the method of specifying the error cause will be described later.

In Step S405, the display unit 7 displays the specified error cause and the method of handling the error cause to notify the user of them.

Then, Steps S307 and S308 are performed in a similar manner to the reference example. After Step S308 is performed, Steps S406 and S407 are performed by the waveform analysis unit 8 in parallel with Step S309. In Steps S401 and S402 described above, the potential change V(t) of the internal standard solution potential for waveform analysis is acquired. In Steps S406 and S407, the sample potential for waveform analysis is acquired, and the parameter (gradient or the like) of the potential change V(t) of the sample potential and the parameter for the frequency are acquired, and the results of the acquisition are stored in the database 6.

Then, when it is determined in Step S310 that there is an abnormality in the sample potential, from the standard deviation $\sigma(S)$, the difference $\Delta V(S)$ between the maximum value and the minimum value, and the average value $V_{avg}(S)$ calculated by the concentration calculation unit 5 (YES), Steps S408 to S410 are performed instead of Step S311.

Since Steps S408 to S410 are different from Steps S403 to S405 only in that processing is performed on the sample potential for waveform analysis instead of the internal standard solution potential for waveform analysis, the description thereof will be omitted. Then, Steps S312 and S315 are performed in a similar manner to the reference example. In this manner, by specifying the error cause in parallel with the calculation of the ion concentration by the concentration calculation unit 5, it is possible to reduce the processing time per measurement, and to improve the measurement throughput.

The analysis method according to the present embodiment is not limited to the steps described above, and may include additional steps. For example, after the measurement result is displayed on the display unit 7 in Step S313, the control unit 4 can determine the necessity of re-measurement. When the re-measurement is necessary, the re-measurement can be performed. Alternatively, after Step S313, a GUI screen for inputting the necessity of the re-measurement may be displayed on the display unit 7, and the user is prompted to input the necessity of the re-measurement from the input unit 3 to encourage the re-measurement. Thus, it is possible to secure the reliability of the measured value of the ion selective electrode.

(Method of Acquiring Parameter of Potential Change V(t))

A method of acquiring the parameter by regression analysis of the potential changes V(t) of the internal standard solution potential and the sample potential in Steps S402 and S407 will be described more specifically.

Figure 5:
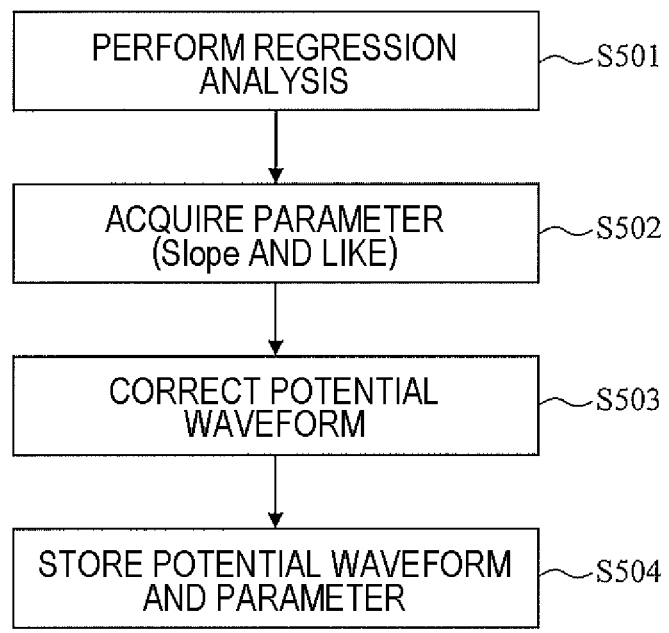
FIG. 5 is a flowchart illustrating a method of acquiring a parameter of a waveform of the potential change.

FIG. 5 is a flowchart illustrating the method of acquiring the parameter of the potential change V(t). An example of obtaining Slope serving for an index of the gradient, by regression analysis, as an example of the parameter of the potential change V(t), will be described below.

First, in Step S501, the waveform analysis unit 8 performs regression analysis to obtain Slope serving for an index of the gradient of the potential change V(t) ($t_i < t < t_e$), by using the following approximate Equation (1).

[Equation 1]

$$V(t) = V_0 + \text{Slope} \times t \quad (1)$$

In Equation (1), $V_0$ indicates a potential at time $t_i$.

In the regression analysis operation described above, a least squares method, a maximum likelihood estimation method and the like can be used. In the least squares method, a difference between the acquired potential change V(t) in the range of $t_i < t < t_e$ and the calculation equation is minimized. In the maximum likelihood estimation method, the probability that the calculation equation when the parameter is given regresses the acquired potential change V(t) is maximized. Alternatively, a method of minimizing a difference between an approximate equation and an actual measurement value, such as Bayesian estimation or a machine learning algorithm, can also be used. As the regression analysis method in this Step S501, only one type may be used, or a plurality of methods may be used.

In Step S502, the waveform analysis unit 8 acquires Slope serving for the index of the gradient of the potential change V(t), as the parameter, from the result of the regression analysis.

In Step S503, the waveform analysis unit 8 obtains the corrected potential change $V_{corr}(t)$ by using the following Equation (2). Thus, $V_{corr}(t)$ in which Slope is close to 0 is obtained. By performing Step S503, the slope of the potential change V(t) is corrected to a value close to 0. Thus, it is possible to facilitate the frequency analysis of the potential change V(t), which will be described later.

[Equation 2]

$$V_{corr}(t) = V(t) - (V_0 + \text{Slope} \times t) \quad (2)$$

In Step S504, the potential changes V(t) and $V_{corr}(t)$ and the parameters $V_0$ and Slope are stored in the database 6.

The database 6 stores an abnormality threshold value of Slope. In Steps S403 and S408, the waveform analysis unit 8 compares the value of Slope obtained from the regression analysis for each of the internal standard solution potential and the sample potential, to the abnormality threshold value stored in the database 6.

In the regression analysis in Step S501, an approximate equation such as a polynomial function, an exponential function, a logarithmic function, or a trigonometric function may be used for the potential change V(t) in addition to the linear approximate equation such as Equation (1). The parameter of the potential change V(t) is not limited to Slope and can be freely set. $V_{corr}(t)$ can also be freely set in accordance with the type of approximate equation to be used.

In the acquisition of the parameter in Step S502, the waveform analysis unit 8 may further acquire a correlation parameter. The correlation parameter is an index for evaluating the correlation between the value regressed by each regression analysis method (least squares method, maximum likelihood estimation method, Bayesian estimation, machine learning algorithm) and the actual measurement value. Specifically, the correlation parameter is a determination coefficient, a chi-square value, or the like used in a least squares method or the like. The correlation parameter is used as an index of reliability of regression analysis accuracy. The waveform analysis unit 8 can acquire the correlation parameter and evaluate the correlation between the result of the regression analysis and the potential change V(t). For example, the waveform analysis unit 8 may refer to a certain parameter A (such as Slope) obtained by the regression analysis and the correlation parameter to determine that the parameter A is not adopted, when the correlation parameter (reliability) is low. A plurality of correlation parameters can be acquired in each regression analysis method, and a combination of the correlation parameters can be used. Furthermore, since the correlation parameter to be used is different for each regression analysis method, the correlation parameter can be simultaneously acquired for each method.

(Method of Acquiring Parameter Associated with Frequency of Potential change V(t))

Next, a method of acquiring a parameter associated with the frequency of the potential changes V(t) of the internal standard solution potential and the sample potential in Steps S402 and S407 in FIG. 4 (method of frequency analysis) will be described.

Figure 6:
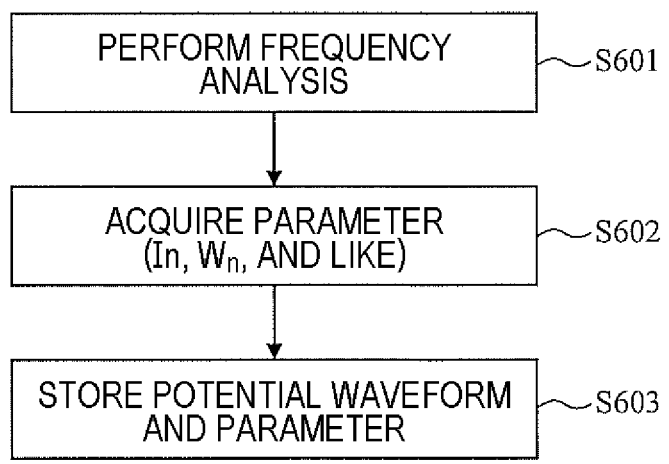
FIG. 6 is a flowchart illustrating a frequency analysis method of the potential change.

FIG. 6 is a flowchart illustrating the method of acquiring the parameter associated with the frequency of the potential change V(t). First, in Step S601, the waveform analysis unit 8 analyzes a frequency component in the potential change V(t) with respect to a time region ($t_i < t < t_e$) of the potential change V(t). At this time, when the value of Slope acquired in Step S502 is large, the above-described corrected potential change $V_{corr}(t)$ may be used. In the analysis of the frequency component, for example, a known method such as a fast Fourier transform (FFT) or spectral power density conversion can be adopted.

In Step S602, the waveform analysis unit 8 calculates the intensity distribution of each frequency component analyzed in Step S601. Further, the waveform analysis unit 8 extracts, as parameters, information regarding the median $x_n$, the intensity $I_n$, and the width $W_n$ of each peak in the intensity distribution of the frequency.

Figure 7:
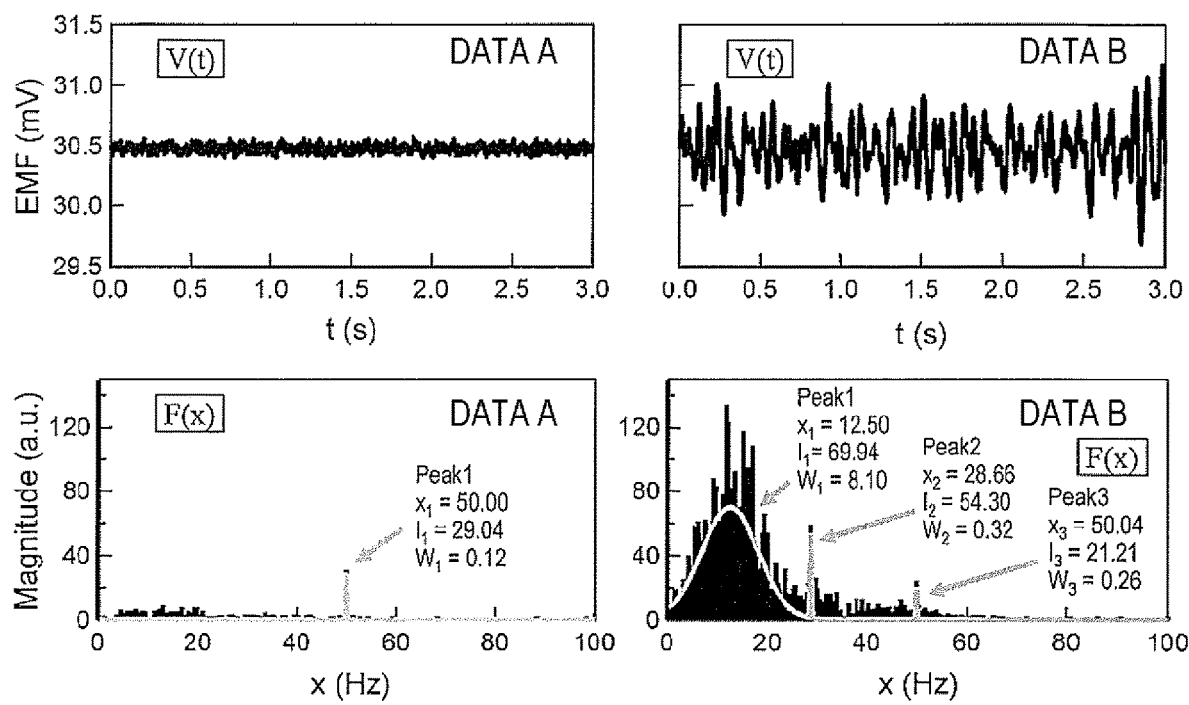
FIG. 7 is a diagram illustrating an example of a frequency analysis of the potential change by a fast Fourier transform.

FIG. 7 is a diagram illustrating an example of analyzing the frequency component in the potential change V(t) by the fast Fourier transform. In the description with reference to FIG. 7, for data A and data B (upper part of FIG. 7) indicating two different potential changes V(t) (1 ms<t<3000 ms), the intensity distributions F(x) (lower part of FIG. 7) of frequency components in each of the potential changes V(t) is extracted by the fast Fourier transform. Then, regression analysis is performed on each the intensity distribution F(x) by the following Equation (3). Thus, the median value $x_n$, the intensity $I_n$, the width $W_n$, and the constant $y_n$ for each of the k intensity distributions can be obtained.

[Equation 3]

$$F(x) = \sum_{n=1}^{k}\left(y_n + I_n \times \exp\left(-\left(\frac{x-x_n}{W_n}\right)^2\right)\right) \quad (3)$$

At this time, in the analysis of the intensity distribution F(x) of the frequency, as long as parameters correlated with or related to the median value $x_n$, the intensity $I_n$, and the width $W_n$ for each peak in the intensity distribution F(x) can be extracted, not only the fast Fourier transform or the spectral power density transform but also other methods may be used.

In Step S603, each parameter value (median value $x_n$, intensity $I_n$, width $W_n$ and constant $y_n$ for each of k intensity distributions) is stored in the database 6.

(Method of Specifying Error Cause)

Next, a method of specifying an error cause in Steps S403 to S405 and S408 to S410 in FIG. 4 will be described. The error cause is specified by using the correlation among the parameters such as the standard deviation σ, the difference ΔV between the maximum value and the minimum value and the average value $V_{avg}$ of the potential change V(t), Slope obtained by regression analysis, and the median value $x_n$, the intensity $I_n$, and the width $W_n$ of the intensity distribution obtained by frequency analysis, and the abnormality threshold value provided for each parameter.

Figure 8:
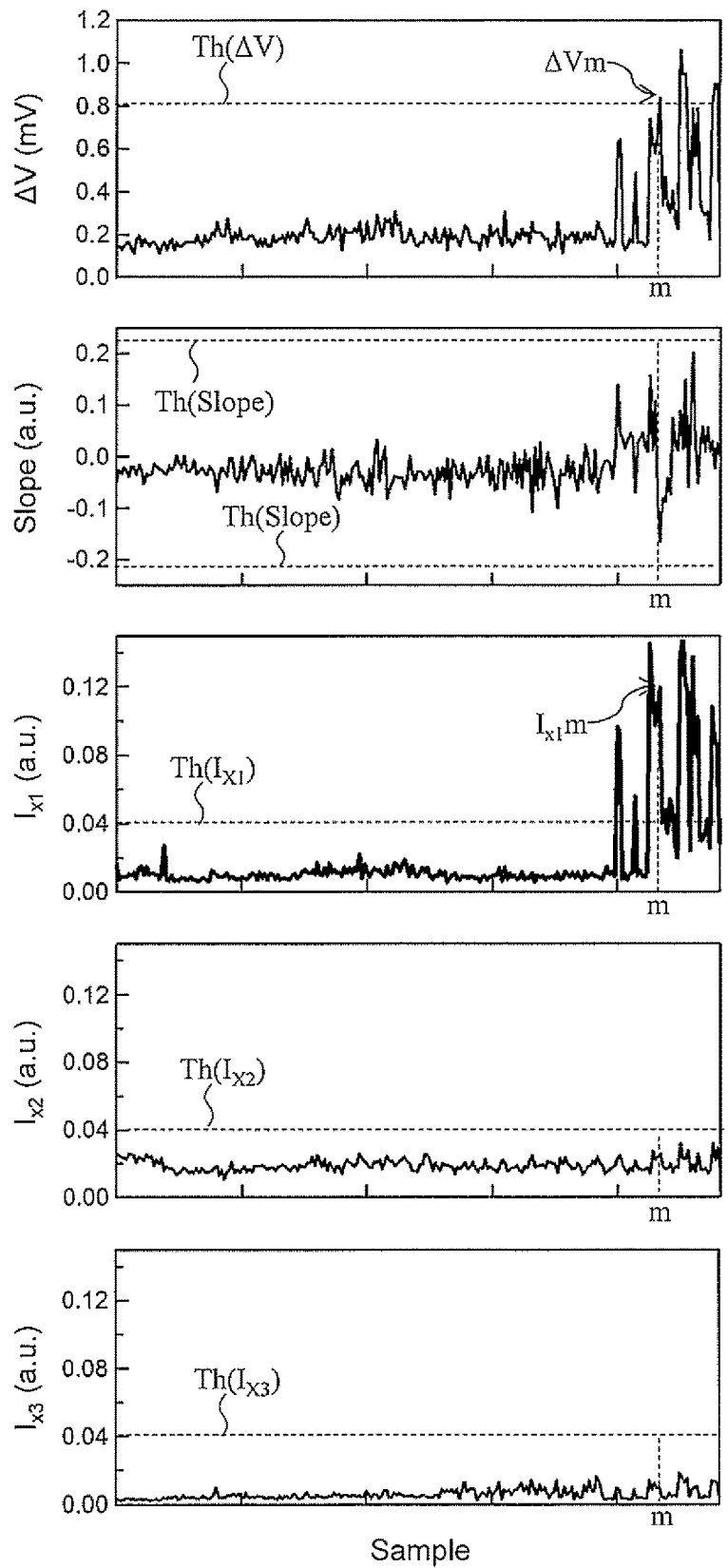
FIG. 8 is a diagram for explaining a method of specifying a cause of an abnormality.

FIG. 8 is a diagram illustrating the method of specifying an error cause. In the five graphs in FIG. 8, the parameters, that are obtained by measuring a plurality of samples, ΔV, Slope, intensity $I_{x1}$ of a frequency $X_1$, intensity $I_{x2}$ of a frequency $X_2$, and intensity $I_{x3}$ of a frequency $X_3$ are set as vertical axes in order from the top. The horizontal axes indicate a sample number attached to each sample in a measurement order. In each graph, an abnormality threshold value Th provided for each parameter is shown. An upper limit and a lower limit of Slope are provided as an abnormality threshold value Th(Slope).

For example, in the m-th sample measurement, when $\Delta V_m$ exceeds the abnormality threshold value Th(ΔV) and it is determined that the abnormality has occurred, a correlation between $\Delta V_m$ and $I_{x1}m$ is recognized, and $I_{x1}m$ also exceeds the abnormality threshold value Th($I_{x1}$). On the other hand, the other parameters do not exceed the abnormality threshold values Th. From this relation, the cause for the determination in Step S310 that the abnormality has occurred (ΔV exceeds the abnormality threshold value Th(ΔV)) can be specified to be a component or disturbance that increases $I_{x1}$.

In this manner, the waveform analysis unit 8 specifies the cause of the abnormality based on each parameter, the abnormality threshold value Th, and the relation between the plurality of parameters (combination of the plurality of parameters). For example, regarding two types of parameters A and B, when the value of (aA+bB) (a and b are coefficients) exceeds the abnormality threshold value Th, the waveform analysis unit 8 can specify that there is the cause of an abnormality in a certain component X. When the plurality of parameters are combined in this manner, the present disclosure is not limited to the sum of the plurality of parameters, and comparison to the abnormality threshold value Th may be performed using a product of the plurality of parameters or the like. Based on a certain type of parameter A, when the value of aA exceeds the abnormality threshold value Th, it can be specified that there is the cause of an abnormality in a certain component Y.

As described above, the abnormality threshold value Th of each parameter is stored in the database 6 and can be appropriately changed. The present disclosure is not limited to the method of specifying the error cause by the abnormality threshold value Th as described above. For example, the error cause may be specified by a machine learning method using a discriminant model that has learned the relation between each parameter stored in the database 6 in Steps S305, S310, S402, and S407 and the error cause. For example, when it is specified that the cause of the abnormality is in a component X, Y, or Z of the electrolyte analysis unit 1, the waveform analysis unit 8 performs classification, for example, that the cause of the abnormality is in the component X, the cause of the abnormality is in the components X and Y, or the cause of the abnormality is in the components X and Z, based on one of the parameters acquired by the waveform analysis or the relation between a plurality of parameters. In this manner, the cause of the abnormality of the components X, Y, and Z is detected not only by the abnormality threshold value Th for one parameter but also by the abnormality threshold value Th for the relation between the plurality of parameters. Thus, the number of classifications for the causes of the abnormality may be set to be plural.

The specific measurement procedure and the method of specifying the error cause by the parameter extraction associated with the gradient and the frequency of the potential change have been described above. Regardless of the above procedure, different procedures, for example, differentiation and peak identification of V (t) may be used as long as two or more types of liquids having different ion concentration can be put into the flow path and the parameters associated with the potential change and the frequency can be acquired.

In FIG. 8, the method of specifying the cause of the abnormality by analyzing the waveform at the time of continuous measurement has been described. It is not necessary to specify the cause of the abnormality at the time of continuous measurement, and the waveform of the potential change at the time of an operation of a preliminary operation or calibration may be analyzed. At the time of waveform analysis, not only the potential waveform of one type of ion selective electrode 101 but also the potential waveforms of a plurality of types of ion selective electrodes 101 may be combined and analyzed. As a result, it is possible to improve the analysis accuracy.

The analysis device 100 may further include a sensor (first sensor) that detects air bubbles in the flow path, a sensor (second sensor) that detects a vibration of the component of the electrolyte analysis unit 1, a sensor (third sensor) that measures a surface potential of a target object, or the like. The analysis device 100 may use output values of the sensors together in addition to the above parameters. In this case, data indicating the relation between the output value of each sensor and the error cause is stored in the database 6. The waveform analysis unit 8 can specify the error cause by comparing the parameter and the output value of the sensor with the abnormality specification data in the database 6. The "surface potential of the target object" refers to a surface potential of the component of the electrolyte analysis unit 1. When the component of the electrolyte analysis unit 1 has a surface potential, a weak current may be mixed in the potential measurement unit 2 to fluctuate the measured value. Thus, by the sensor (third sensor) monitoring the surface potential of the component of the electrolyte analysis unit 1, it is possible to more easily determine whether the error cause is due to electrical noise.

Technical Effects

As described above, the analysis device 100 according to the present embodiment can specify the cause of the measurement error by obtaining the parameter for the potential change V(t) and the parameter for the frequency of the potential change V(t), comparing each parameter to the abnormality threshold value, and referring to the relation between the plurality of parameters and the abnormality specification data. As a result, it is possible to make the user notice a location in which the measurement error may be caused, and an improvement method for the error. Therefore, it is possible to reduce the time required to specify the location as the error cause and to reduce the work load on the user.

In addition, the analysis device 100 in the present embodiment can specify the cause when the abnormality has occurred, in parallel with the measurement of the internal standard solution potential, the measurement of the sample potential, and the calculation of the ion concentration. Thus, the measurement throughput is not decreased.

Second Embodiment

In the first embodiment, the method of obtaining the parameter for the potential change V(t) and the parameter for the frequency of the potential change V(t), and specifying the cause of the abnormality based on the abnormality threshold value for each parameter and the relation between the plurality of parameters has been described.

On the other hand, in a second embodiment, a method of detecting a sign of an abnormality (occurrence of a measurement error) based on threshold values (sign threshold values) for the parameter for the potential change V(t) and the parameter for the frequency of the potential change V(t), or a change of the parameter over time, and specifying a cause that may cause a measurement error will be described.

<Analysis Device>

As an analysis device according to the second embodiment, a similar device to the analysis device 100 described in the first embodiment can be used.

<Analysis Method>

Figure 9:
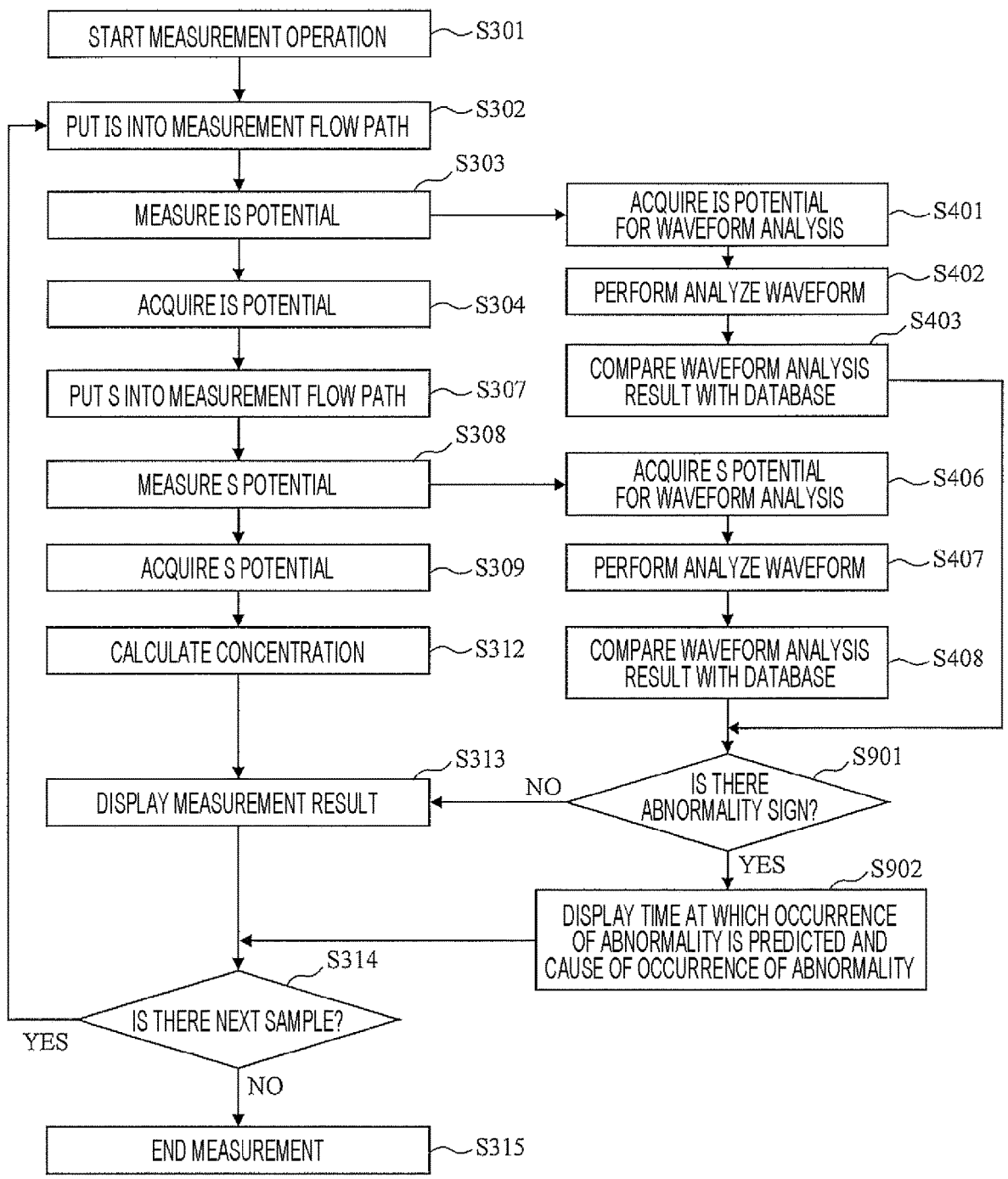
FIG. 9 is a flowchart illustrating an analysis method according to a second embodiment.

FIG. 9 is a flowchart illustrating an analysis method according to the second embodiment. In FIG. 9, steps similar to those illustrated in FIGS. 3 and 4 (first embodiment) are denoted by the same reference signs. Only differences from the flowchart in FIG. 4 will be described below.

First, in parallel with Steps S304 and S307 performed after Step S303, Steps S401 to S403 are continuously performed by the waveform analysis unit 8. In the present embodiment, Step S305 by the concentration calculation unit 5 is omitted. Steps S404 and S405 performed by the waveform analysis unit 8 are also omitted.

Specifically, in parallel with Steps S303 and S307, the waveform analysis unit 8 acquires an internal standard solution potential for waveform analysis in Step S401. In Step S402, the waveform analysis unit 8 acquires a parameter (such as a gradient) of the potential change V(t) and a parameter for the frequency (such as a parameter based on the intensity distribution F(x)), and stores the parameters in the database 6. Then, in Step S403, the waveform analysis unit 8 refers to the database 6 to compare each calculated parameter with the sign threshold value. Details of the sign threshold value will be described later. For example, the sign threshold value can be set to the maximum value or a range of values with which it can be determined that there is an abnormality sign. The sign threshold value can be set to a value lower than the abnormality threshold value in the first embodiment.

Then, after the electrolyte analysis unit 1 puts a sample into the measurement flow path in Step S308, Steps S406 to S408 and S901 are continuously performed by the waveform analysis unit 8 in parallel with Steps S309 and S313. In the present embodiment, Step S310 by the concentration calculation unit 5 is omitted. Steps S409 and S410 performed by the waveform analysis unit 8 are also omitted.

Since Steps S406 to S408 are different from Steps S401 to S403 only in that processing is performed on the sample potential for waveform analysis instead of the internal standard solution potential for waveform analysis, the description thereof will be omitted.

Then, in Step S901, the waveform analysis unit 8 determines whether or not there is an abnormality sign based on the result of the comparison between each parameter and the sign threshold value for the parameter in Steps S403 and S408 and abnormality sign data (abnormality analysis data) stored in the database 6. As in the first embodiment, a certain parameter may be compared to the sign threshold value, or a relation between a plurality of parameters (such as a sum or a product of a plurality of parameters) may be compared to the sign threshold value. Alternatively, whether there is an abnormality sign may be determined from a combination of parameters exceeding the sign threshold values.

Here, an example of the sign threshold value will be described. For example, the sign threshold values can be set stepwise. In this case, the waveform analysis unit 8 can determine that there is a sign of an abnormality, when the speed at which the value of each parameter or the relation between the parameters exceeds the stepwise sign threshold values is larger than a certain speed. The sign threshold value may be set to a value that may cause an error in the future. In this case, the waveform analysis unit 8 can determine that there is a sign of an abnormality, when the parameter exceeds the sign threshold value.

The database 6 stores the sign threshold value for each parameter and the abnormality sign data. The abnormality sign data indicates information of a cause that may induce an error in the future and a component that may cause an abnormality, information such as a cause outside the device, a description of a handling method, a predicted time such as an occurrence time, and the like, when each parameter or the relation between the parameters exceeds the sign threshold value. The abnormality sign data stored in the database 6 may be based on information on a potential waveform at the time of device shipment or a continuous operation, or may be freely set.

When it is determined in Step S901 that there is a sign of an abnormality (YES), the display unit 7 displays a state of the abnormality sign and a handling method based on the abnormality sign data in the database 6 in Step S902. When it is determined that there is no sign of an abnormality (NO), the display unit 7 displays only the ion concentration (measurement result) calculated by the concentration calculation unit 5, in Step S313. Then, Steps S314 and S315 are performed in a similar manner to the above description.

In the determination of a sign of an abnormality in Step S901, the waveform analysis unit 8 can refer to the past potential waveform and parameters stored in the database 6. At this time, the waveform analysis unit may detect a change point or an outlier of the time-series change of each parameter stored in the database 6. Specifically, for example, the waveform analysis unit 8 can acquire each parameter over time, calculate a change amount of the parameter per unit time, and determine that there is a sign of an abnormality when the change point or the outlier of the change amount is detected. In this case, the database 6 stores the abnormality sign data indicating information of a cause that may cause an error in the future and a component that may cause an abnormality, information such as a cause outside the device, a description of a handling method, predicted time such as an occurrence time, and the like, when the change point or the outlier for the change amount of each parameter is detected.

Alternatively, the sign of the abnormality may be specified by a machine learning method using a discriminant model that has learned the relation between each parameter stored in the database 6 in Steps S402 and S407 and the abnormality sign. For example, when the abnormality sign of the component X, Y, or Z of the electrolyte analysis unit 1 is detected, the waveform analysis unit 8 performs classification, for example, that the abnormality sign is in the component X, the abnormality sign is in the components X and Y, or the abnormality sign is in the components X and Z, based on one of the parameters acquired by the waveform analysis or the relation between a plurality of parameters. In this manner, the abnormality sign of the components X, Y, and Z is detected not only by the sign threshold value related to one parameter but also by the sign threshold value for the relation between the plurality of parameters. Thus, the number of classifications for the abnormality sign may be set to be plural.

In addition, when it is determined in Step S901 that there is a sign of an abnormality, not only the method of improving the component and the cause of the disturbance that may cause the abnormality may be displayed on the display unit 7 and reported to the user and a maintenance manager, but also an order of a replacement component, a contact to a support company, and the like may be automatically performed. Thus, it is possible to reduce a workload of the user and the maintenance manager.

The method of detecting the sign of the abnormality in the present embodiment may be used in combination with the specification of the error cause described in the first embodiment.

Steps S401 to S403, S406 to S408, and S901 in FIG. 9 can be measured for each time. The performing interval of these steps can also be freely set by the user or the maintenance manager. In a case of setting the performing interval, for example, a GUI screen for setting the performing interval is displayed on the display unit 7. The user inputs a desired performing interval from the input unit 3, so that the control unit 4 controls the processes by the concentration calculation unit 5 and the waveform analysis unit 8 in accordance with the set performing interval. For example, the detection of a sign of an abnormality in the present embodiment can be performed at the time of maintenance and examination of the analysis device 100 (for example, once every one month to two months).

Also in the present embodiment, as in the first embodiment, the analysis device 100 may further include a sensor that detects air bubbles in the flow path, a sensor that detects a vibration of the component of the electrolyte analysis unit 1, a sensor that measures a surface potential of a target object, or the like. The analysis device 100 may use output values of the sensors together in addition to the above parameters. In this case, data indicating the relation between the output value of each sensor and the sign of an abnormality is stored in the database 6. The waveform analysis unit 8 can predict an occurrence of an abnormality by comparing the parameter and the output value of the sensor with the abnormality sign data in the database 6.

Technical Effects

As described above, the analysis device 100 according to the present embodiment acquires the parameter for the potential change V(t) and the parameter for the frequency of the potential change V(t), compares the acquired parameters to the sign threshold values stored in the database 6, and detects the sign of an abnormality occurrence by referring to the relation between the plurality of parameters and the abnormality sign data. Thus, it is possible to notify the user of a cause location or disturbance that may cause an abnormality in the future before the abnormality occurs. Since the maintenance time can be planned in advance, it is possible to avoid sudden stop of the analysis device 100 and to perform the maintenance management work at a time when the operation rate of the analysis device 100 is low. Thus, it is possible to contribute to improvement of the measurement throughput.

Third Embodiment

In the first embodiment, it has been described that the cause of the measurement error includes mixing of air bubbles into the flow path. In a third embodiment, a method in which a mechanism that intentionally mixes air bubbles into the flow path is provided, and the degree of an influence on the gradient and the frequency of the potential change V(t) when the air bubbles are mixed into the flow path is evaluated will be described.

<Example of Configuration of Analysis Device>

Figure 10:
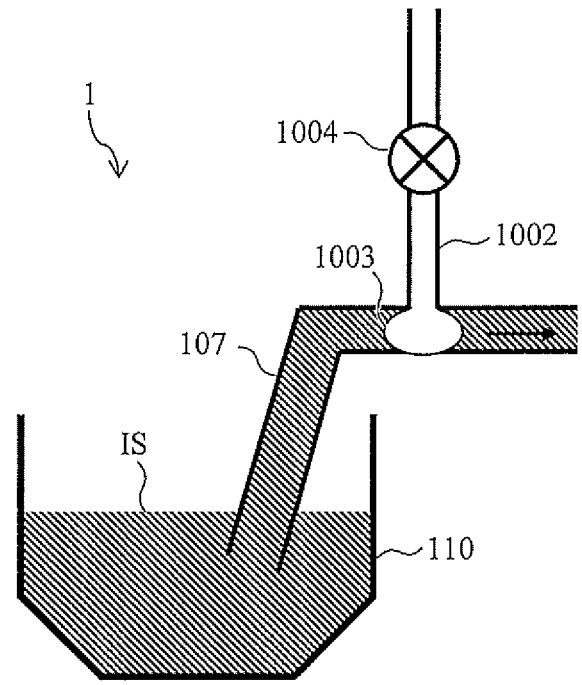
FIG. 10 is a schematic diagram illustrating a partial configuration of an analysis device according to a third embodiment.

FIG. 10 is a schematic diagram illustrating a partial configuration of an analysis device according to the third embodiment. FIG. 10 illustrates the dilution tank 110 and the sipper nozzle 107 of the electrolyte analysis unit 1 illustrated in FIG. 1. As illustrated in FIG. 10, the analysis device according to the present embodiment further includes a flow path 1002 branched from the sipper nozzle 107, and an electromagnetic valve 1004 that controls opening and closing of the flow path 1002. One end of the flow path 1002 is opened to the atmosphere.

The internal standard solution IS is stored in the dilution tank 110. The internal standard solution IS can be fed to the flow path of the sipper nozzle 107 by a suction operation of the sipper syringe pump 133 (not illustrated in FIG. 10).

When the air bubbles are mixed into the flow path of the sipper nozzle 107, the air bubbles 1003 can be sucked into the flow path by opening the electromagnetic valve 1004 and causing the sipper syringe pump 133 to perform a suction operation. The minimum diameter of the air bubble 1003 can be set to a size capable of dividing the flow path inner diameter. For example, when the inner diameter of the flow path is 1 mm, the volume of the air bubble 1003 is 0.52 µL. The size of the air bubbles 1003 can be controlled in accordance with the suction amount of the sipper syringe pump 133. The movement distance (position) of the air bubble 1003 can be changed by closing the electromagnetic valve 1004 and adjusting the suction amount of the sipper syringe pump 133.

The electromagnetic valve 1004 and the sipper syringe pump 133 communicate with the control unit 4. The control unit 4 can control the opening/closing operation of the electromagnetic valve 1004 and the suction/discharge operation by the sipper syringe pump 133.

The flow path 1002 including the electromagnetic valve 1004 may be configured to be detachable from the sipper nozzle 107.

<Analysis Method>

In an analysis method in the present embodiment, air bubbles of which sizes and positions are set are mixed into the flow path. The mixing of the air bubbles is combined with, for example, the sample measurement operation described in the first embodiment. The waveform analysis unit 8 compares the analysis result of the potential change V(t) when the air bubbles are intentionally mixed, with data stored in the database 6. Thus, it is possible to verify the degree of an influence of the bubble size or a bubble mixing position on the gradient and the frequency of the potential change V(t).

For example, air bubbles can be mixed before normal measurement of a sample. A parameter obtained by regression analysis or frequency analysis of the potential change V(t) at that time can be stored in the database 6 as an abnormality threshold value of the parameter.

The present embodiment is also useful when it is determined that there is a certain abnormality in the analysis device 100. Specifically, the parameter of the potential change V(t) at the time of abnormality is acquired in the similar manner to that in the first embodiment and the mechanism of mixing the air bubbles in the present embodiment is attached to the analysis device 100. Then, the parameter of the potential change V(t) is acquired in a state where the air bubbles are mixed, and the parameter at the time of the occurrence of an abnormality is compared with the parameter at the time of mixing air bubbles. When there is a correlation between the parameter at the time of the occurrence of an abnormality and the parameter at the time of mixing air bubbles, it can be determined that the abnormality occurring in the analysis device 100 is due to air bubble mixing.

Technical Effects

As described above, the analysis device according to the present embodiment has a configuration of putting air bubbles into the flow path of the electrolyte analysis unit 1. The analysis device according to the present embodiment can test and evaluate the degree of an influence on the gradient and the frequency of the potential change V(t) when the air bubbles are mixed. Thus, it is possible to grasp the state of the analysis device, perform maintenance and examination of the analysis device before the occurrence of an abnormality, and reduce sudden downtime.

Fourth Embodiment

In the first embodiment, it has been described that the error cause of the measurement error includes a vibration of the analysis device. In a fourth embodiment, a configuration in which a mechanism that intentionally applies a vibration to the analysis device 100 is provided and an analysis method for evaluating the degree of an influence on the gradient and the frequency of the potential change V(t) when a vibration is applied will be described.

<Example of Configuration of Analysis Device>

Figure 11:
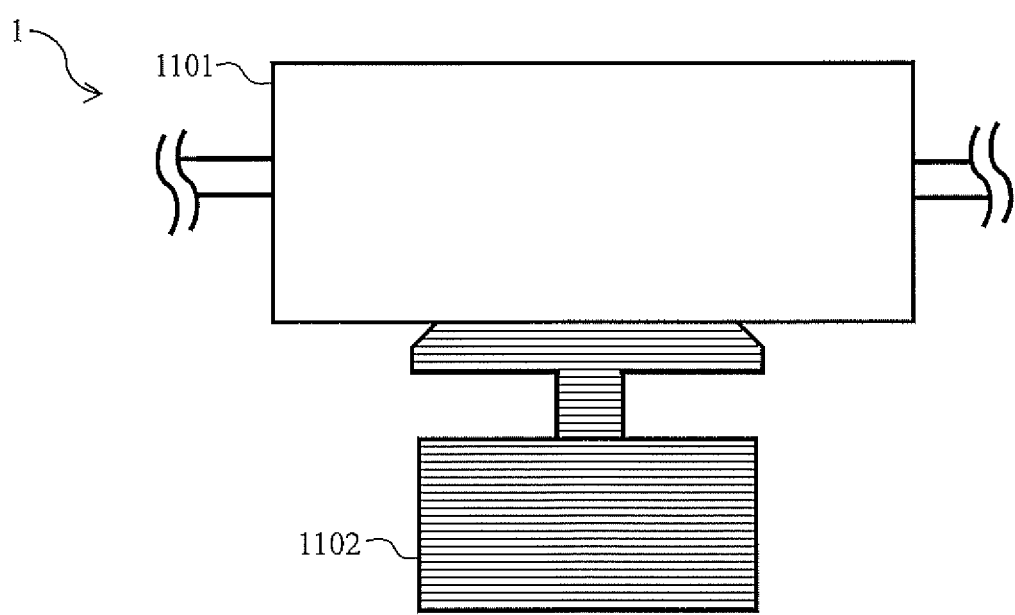
FIG. 11 is a schematic diagram illustrating a partial configuration of an analysis device according to a fourth embodiment.

FIG. 11 is a schematic diagram illustrating a partial configuration of an analysis device according to the fourth embodiment. As illustrated in FIG. 11, the analysis device according to the present embodiment further includes a container 1101 that contains the ion selective electrode 101, the comparative electrode 104, and the pinch valve 105 in the electrolyte analysis unit 1 illustrated in FIG. 1, and a vibrator 1102 that vibrates the container 1101. The vibrator 1102 has a function of freely setting an amplitude of 0.01 mm to 3 mm in a three-dimensional direction and a frequency of 10 Hz to 100 Hz and vibrating the container 1101.

Instead of providing the vibrator 1102, a vibration may be applied to the electrolyte analysis unit 1 by operating the components such as various nozzles, electromagnetic valves, and pinch valves at an intentional timing.

The vibrator 1102 and various components communicate with the control unit 4, and can control vibration conditions via the control unit. The vibrator 1102 may be configured to be detachable from the container 1101.

<Analysis Method>

In an analysis method according to the present embodiment, a vibration in which an amplitude, a frequency, and a vibration direction are set is intentionally applied to the electrolyte analysis unit 1. The applying the vibration is combined with, for example, the sample measurement operation described in the first embodiment. The waveform analysis unit 8 compares the analysis result of the potential change V(t) when the vibration is intentionally applied, with data stored in the database 6. Thus, it is possible to verify the degree of an influence of a vibration amplitude and the vibration frequency on the gradient and the frequency of the potential change V(t).

For example, a vibration can be applied to the electrolyte analysis unit 1 before normal measurement of a sample. A parameter obtained by regression analysis or frequency analysis of the potential change V(t) at that time can be stored in the database 6 as an abnormality threshold value of the parameter.

The present embodiment is also useful when it is determined that there is a certain abnormality in the analysis device 100. Specifically, the parameter of the potential change V(t) at the time of abnormality is acquired in the similar manner to that in the first embodiment and the mechanism of applying a vibration in the present embodiment is attached to the analysis device 100. Then, the parameter of the potential change V(t) is acquired in a state where the vibration is applied, and the parameter at the time of the occurrence of an abnormality is compared with the parameter at the time of applying a vibration. When there is a correlation between the parameter at the time of the occurrence of an abnormality and the parameter at the time of applying a vibration, it can be determined that the abnormality occurring in the analysis device 100 is due to a vibration.

Technical Effects

As described above, the analysis device according to the present embodiment has a configuration of applying a vibration to the electrolyte analysis unit 1. The analysis device according to the present embodiment can test and evaluate the degree of an influence on the gradient and the frequency of the potential change V(t) when the vibration is applied. Thus, it is possible to grasp the state of the analysis device, perform maintenance and examination of the analysis device before the occurrence of an abnormality, and reduce sudden downtime.

Fifth Embodiment

In the first embodiment, it has been described that the error cause of the measurement error includes generation of electrical noise. In a fifth embodiment, a configuration in which a mechanism that intentionally applies electrical noise to the analysis device 100 is provided and an analysis method for evaluating the degree of an influence on the gradient and the frequency of the potential change V(t) when there is electrical noise will be described.

<Example of Configuration of Analysis Device>

Figure 12:
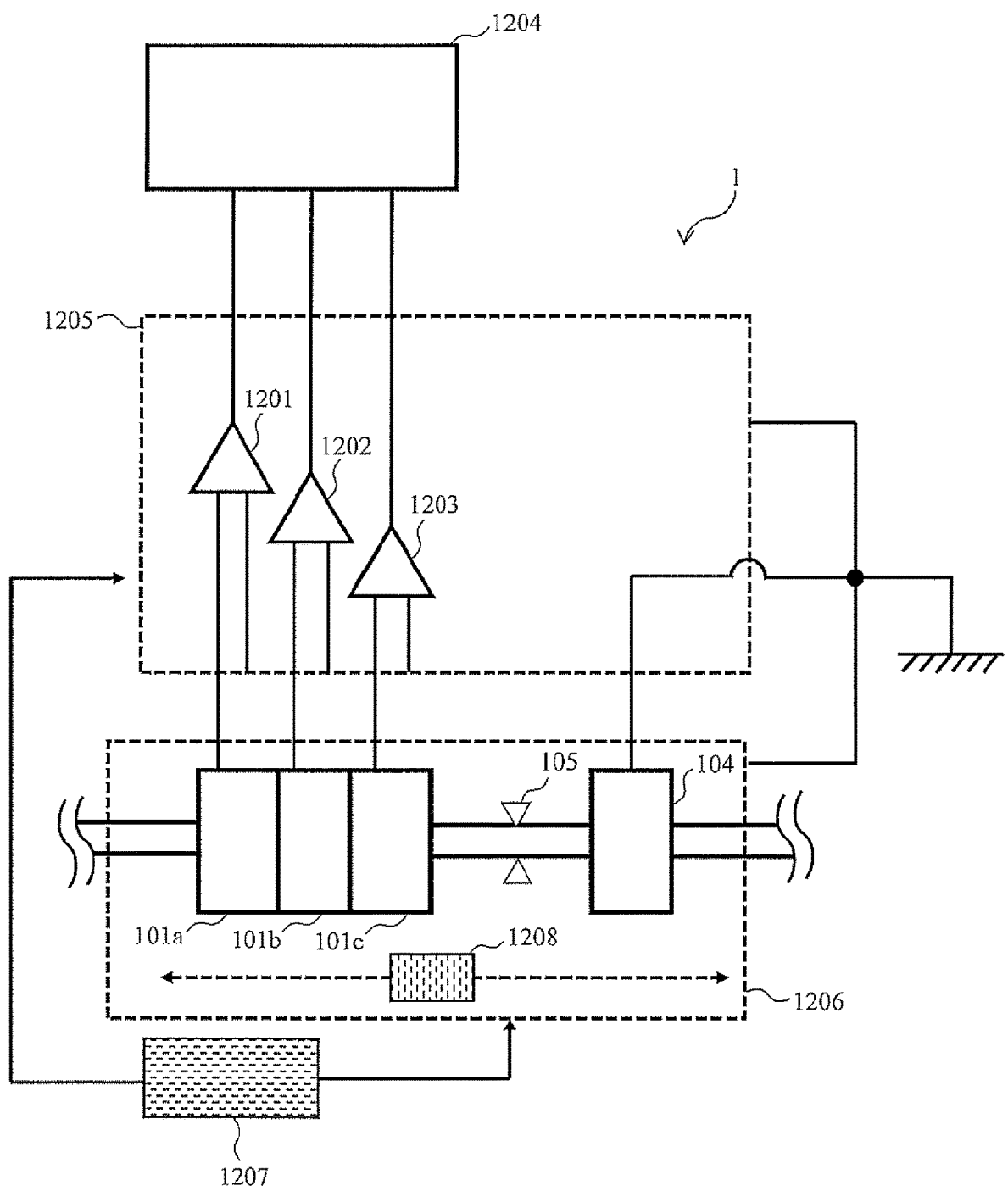
FIG. 12 is a schematic diagram illustrating a partial configuration of an analysis device according to a fifth embodiment.

FIG. 12 is a schematic diagram illustrating a partial configuration of an analysis device according to the fifth embodiment. As illustrated in FIG. 12, in the analysis device according to the present embodiment, the electrolyte analysis unit 1 further includes impedance conversion circuits 1201 to 1203, an AD converter 1204, electromagnetic shields 1205 and 1206, a power supply device 1207, and a voltage generation device 1208.

The impedance conversion circuits 1201 to 1203 are based on OP amplifiers that output respective potentials from the comparative electrode 104 and the ion selective electrodes 101a to 101c. The AD converter 1204 digitally converts the output potentials of the impedance conversion circuits 1201 to 1203.

The electromagnetic shield 1205 covers the ion selective electrodes 101a to 101c, the comparative electrode 104, and the pinch valve 105 to avoid mixing of electrical noise from the outside.

The electromagnetic shield 1206 covers the impedance conversion circuits 1201 to 1203 to avoid mixing of electrical noise from the outside.

The power supply device 1207 applies a variable current to the electromagnetic shields 1205 and 1206. The power supply device 1207 mounts a converter/inverter and can change a frequency and a current value of an AC current.

The voltage generation device 1208 is provided in the electromagnetic shield 1205 and is configured to be able to freely change the position thereof. The voltage generation device 1208 applies a variable voltage to the electromagnetic shield 1205.

The power supply device 1207 and the voltage generation device 1208 communicate with the control unit 4. The control unit 4 can control the current value and the frequency of the power supply device 1207, the voltage value of the voltage generation device 1208, and the position of the voltage generation device 1208. In this manner, by controlling the power supply device 1207 and the voltage generation device 1208, electrical noise can be applied to the electromagnetic shields 1205 and 1206.

The electromagnetic shields 1205 and 1206, the power supply device 1207, and the voltage generation device 1208 may be configured to be detachable from the electrolyte analysis unit 1.

<Analysis Method>

In an analysis method according to the present embodiment, electrical noise having a known (set) installation environment, a known (set) voltage value, and a known (set) current value is intentionally applied to the electrolyte analysis unit 1. The applying the electrical noise is combined with, for example, the sample measurement operation described in the first embodiment. The waveform analysis unit 8 compares the analysis result of the potential change V(t) when the electrical noise is intentionally applied, with data stored in the database 6. Thus, it is possible to test the degree of an influence of a grounding environment or electrical noise on the gradient and the frequency of the potential change V(t).

For example, electrical noise can be applied to the electrolyte analysis unit 1 before normal measurement of a sample. A parameter obtained by regression analysis or frequency analysis of the potential change V(t) at that time can be stored in the database 6 as an abnormality threshold value of the parameter.

The present embodiment is also useful when it is determined that there is a certain abnormality in the analysis device 100. Specifically, the parameter of the potential change V(t) at the time of abnormality is acquired in the similar manner to that in the first embodiment and the mechanism of applying electrical noise in the present embodiment is attached to the analysis device 100. Then, the parameter of the potential change V(t) is acquired in a state where the electrical noise is applied, and the parameter at the time of the occurrence of an abnormality is compared with the parameter at the time of applying the electrical noise. When there is a correlation between the parameter at the time of the occurrence of an abnormality and the parameter at the time of applying electrical noise, it can be determined that the abnormality occurring in the analysis device 100 is due to the electrical noise.

Technical Effects

As described above, the analysis device according to the present embodiment has a configuration of applying electrical noise to the electrolyte analysis unit 1. The analysis device according to the present embodiment can test and evaluate the degree of an influence on the gradient and the frequency of the potential change V(t) when the electrical noise is applied. Thus, it is possible to grasp the state of the analysis device, perform maintenance and examination of the analysis device before the occurrence of an abnormality, and reduce sudden downtime.

MODIFICATION EXAMPLES

The present disclosure is not limited to the embodiments described above, and includes various modification examples. For example, the above-described embodiments are described in detail in order to explain the present disclosure in an easy-to-understand manner, and it is not necessary to include all the configurations described above. A portion of one embodiment can be replaced with the configuration of another embodiment. It is also possible to add the configuration of one embodiment to the configuration of another embodiment. It is also possible to add, delete, or replace a portion of the configuration of another embodiment with respect to a portion of the configuration of each embodiment.

The application range of the present disclosure is not limited to an automatic analysis device based on the principle of potential difference measurement (ion selective electrode) or colorimetric (absorbance analysis). For example, the present disclosure can be widely applied to an automatic analysis device including a flow cell or a pipe for measuring a generally solution-state sample or supplying or discharging a sample or a reagent. Examples of such automatic analysis device include a latex agglutination analysis device based on turbidity or scattered light intensity, an immunoanalysis device based on an antigen-antibody reaction, or the like.

REFERENCE SIGNS LIST 1 electrolyte analysis unit
2 potential measurement unit
3 input unit
4 control unit
5 concentration calculation unit
6 database
7 display unit
8 waveform analysis unit
101 ion selective electrode
104 comparative electrode
105 pinch valve
106 vacuum suction nozzle
107 sipper nozzle
108 diluent supply nozzle
109 internal-standard-solution supply nozzle
110 dilution tank
111 waste liquid tank
112 vacuum pump
121 to 127 electromagnetic valve
131 internal-standard-solution syringe pump
132 diluent syringe pump
133 sipper syringe pump
141 internal standard solution bottle
151 diluent bottle
161 comparative electrode liquid bottle

The invention claimed is:

1. An analysis device that is configured to measure ion concentration in a sample, comprising:
a processor and a data storage;
an ion selective electrode that is configured to obtain a potential based on the ion concentration;
a reference electrode that is configured to obtain a potential based on a reference liquid;
a measurement device that is configured to measure an electromotive force between the ion selective electrode and the reference electrode;
an analyzer that is configured to analyze a potential change of the electromotive force in a certain time region,
the processor in communication with at least the measurement device and the analyzer;
a flow path for supplying the sample to the ion selective electrode; and
the data storage configured to store abnormality analysis data indicating a relation between the potential change and an abnormality of the analysis device,
wherein the analyzer is configured to
acquire a first parameter for the potential change of the electromotive force measured by the measurement device, and
analyze the abnormality of the analysis device based on the first parameter and the abnormality analysis data stored in advance in the data storage,
wherein
the analyzer is configured to acquire the first parameter by analyzing a frequency of the potential change in the time region and analyzing an intensity distribution of the frequency of the potential change,
the analysis device further comprises a mechanism that is configured to intentionally mix air bubbles into the flow path, or a mechanism that is configured to intentionally apply a vibration to the analysis device, or a mechanism that is configured to intentionally apply electrical noise to the analysis device, and
the analyzer is configured to
acquire the first parameter for the potential change of the electromotive force measured by the measurement device when the air bubbles are mixed into the flow path or when the vibration is applied or when the electrical noise is applied before normal measurement of the sample, and
evaluate a degree of an influence of the mixing of the air bubbles or of the vibration or of the electrical noise on the potential change by comparing the first parameter when the air bubbles are mixed into the flow path or when the vibration is applied or when the electrical noise is applied, with an abnormality threshold value of the first parameter stored in the data storage to obtain, and then store in the data storage, an abnormality threshold value indicating said degree of influence on the first parameter.

2. The analysis device according to claim 1, wherein
the analyzer is configured to acquire a second parameter by regression analysis of the potential change in the time region, and
the analyzer is configured to acquire, as the second parameter, a gradient of an approximate equation of the potential change obtained by the regression analysis.

3. The analysis device according to claim 2, wherein
the data storage is configured to store an abnormality threshold value of the second parameter acquired by the regression analysis, and
the analyzer is configured to specify a cause of the abnormality of the analysis device by comparing the second parameter acquired by the regression analysis with the abnormality threshold value of the second parameter stored in the data storage.

4. The analysis device according to claim 2, wherein
the data storage is configured to store a sign threshold value of the second parameter acquired by the regression analysis, and
the analyzer is configured to determine whether there is a sign of the abnormality in the analysis device, by comparing the second parameter acquired by the regression analysis with the sign threshold value of the second parameter stored in the data storage.

5. The analysis device according to claim 1, wherein the analyzer is configured to specify a cause of the abnormality of the analysis device by comparing the first parameter acquired by analyzing the frequency with the abnormality threshold value of the first parameter stored in the data storage.

6. The analysis device according to claim 1, wherein
the data storage is configured to store a sign threshold value of the first parameter acquired by analyzing the frequency, and
the analyzer is configured to determine whether there is a sign of the abnormality in the analysis device, by comparing the first parameter acquired by analyzing the frequency with the sign threshold value of the first parameter stored in the data storage.

7. The analysis device according to claim 1, wherein
the abnormality analysis data includes abnormality specification data for specifying a cause of the abnormality of the analysis device, and
the analyzer is configured to
acquire a plurality of the first parameters, and
specify the cause of the abnormality of the analysis device based on a relation between the plurality of the first parameters and the abnormality specification data.

8. The analysis device according to claim 1, wherein
the abnormality analysis data includes abnormality sign data for detecting a sign of the abnormality of the analysis device, and
the analyzer is configured to
acquire a plurality of the first parameters, and
determine whether there is a sign of the abnormality in the analysis device, based on a relation between the plurality of the first parameters and the abnormality sign data.

9. The analysis device according to claim 1, wherein the analyzer is configured to
acquire the first parameter over time, and
determine whether there is a sign of the abnormality in the analysis device, based on a change of the first parameter over time, and the abnormality analysis data.

10. The analysis device according to claim 1, wherein the measurement device is configured to measure the potential at a time interval of 0.006 seconds or shorter in the time region.

11. The analysis device according to claim 1, further comprising:
a first sensor that is configured to detect air bubbles mixed in the flow path,
wherein the analyzer is configured to analyze a cause of the abnormality of the analysis device based on an output value of the first sensor, the first parameter, and the abnormality analysis data stored in the data storage.

12. The analysis device according to claim 1, further comprising:
a second sensor that is configured to detect a vibration of the analysis device,
wherein the analyzer is configured to analyze a cause of the abnormality of the analysis device based on an output value of the second sensor, the first parameter, and the abnormality analysis data stored in the data storage.

13. The analysis device according to claim 1, further comprising:
a third sensor that is configured to measure a surface potential of a component of the electrolyte analysis unit of the analysis device,
wherein the analyzer is configured to analyze a cause of the abnormality of the analysis device based on an output value of the third sensor, the first parameter, and the abnormality analysis data stored in the data storage.

* * * * *